United States Patent [19]

Bentivoglio

[11] Patent Number: 5,478,192
[45] Date of Patent: Dec. 26, 1995

[54] BOOM OPERATED FORK TRUCK

[75] Inventor: Giovanni Bentivoglio, Woodbridge, Canada

[73] Assignee: Tovel Manufacturing Limited, Concord, Canada

[21] Appl. No.: 654,513

[22] Filed: Feb. 13, 1991

[30] Foreign Application Priority Data

Feb. 13, 1990 [CA] Canada ................................. 2009968

[51] Int. Cl.⁶ ................................................. B66C 23/687
[52] U.S. Cl. ........................ 414/718; 180/251; 180/297; 212/264; 414/918
[58] Field of Search ...................... 414/685, 718, 414/728, 918; 212/231, 264, 267, 268, 230, 184, 185; 180/233, 234, 245, 246, 251, 297, 241; 474/148, 149, 152, 166, 167

[56] References Cited

U.S. PATENT DOCUMENTS

| Re. 30,021 | 6/1979 | Olson et al. . | |
|---|---|---|---|
| 1,186,648 | 6/1916 | Chaquette | 180/233 |
| 3,224,608 | 12/1965 | Yadon et al. | 414/718 |
| 3,299,981 | 1/1967 | Garrett | 180/297 X |
| 3,478,894 | 11/1969 | Stauffer | 212/268 X |
| 3,599,814 | 8/1971 | Brownfield | 414/718 |
| 3,985,248 | 10/1976 | Liegel et al. | 212/264 X |
| 4,683,987 | 8/1987 | Sakata et al. | 414/918 X |
| 4,718,814 | 1/1988 | Addleman . | |
| 4,889,038 | 12/1989 | Bentivoglio | 92/110 |
| 4,964,778 | 10/1990 | Muto et al. | 414/728 X |
| 4,984,695 | 1/1991 | Goto | 212/264 |

FOREIGN PATENT DOCUMENTS

| 1024107 | 1/1978 | Canada . |
|---|---|---|
| 1275979 | 11/1990 | Canada . |
| 1297383 | 3/1992 | Canada . |
| WO89/00972 | 2/1989 | European Pat. Off. . |
| 2624842 | 6/1989 | France . |
| 2739537 | 3/1978 | Germany . |
| 2137145 | 10/1984 | United Kingdom . |

*Primary Examiner*—Donald W. Underwood
*Attorney, Agent, or Firm*—Neil H. Hughes; Ivor M. Hughes

[57] ABSTRACT

A material handling vehicle comprising a top, bottom, two sides, and two ends, the vehicle having a central axis of extension extending from end to end thereof, the vehicle having a frame disposed therewith the frame having disposed proximate the bottom thereof at least a first and second axle upon which are disposed wheels for engaging terrain being traversed, the bottom of the axles defining a first plane, the frame being disposed above the first plane, the frame having disposed proximate one side thereof and to one side of the central axis of the vehicle a cab wherein an operator having a line of sight is located in use, the frame having disposed on the other side thereof and on the opposite side of the central axis of the vehicle whereat the cab is disposed, driving structure, the driving structure having a bottom, the bottom of the driving structure being disposed on top of the frame and being disposed in a plane above the first plane of the vehicle, and the top of the driving structure being disposed below the line of sight of the operator to allow maximum ground clearance, a clear line of sight and minimum risk of damage to the driving structure, the driving structure also being offset to one side of the axis of extension of the vehicle, the cab and the driving structure defining therebetween an opening the opening being disposed above the first plane, the opening to receive an extensible boom carrying a work implement the boom being pivotally attached at a pivot to the frame proximate one end of the vehicle, the pivot of the extensible boom being dispose above the first plane and below the line of sight of the operator to allow the operator a clear line of sight while carrying a load over rough terrain without the risk of damaging the drive train of the vehicle.

68 Claims, 8 Drawing Sheets

BOOM OPERATED FORK TRUCK

FIELD OF INVENTION

This invention relates to material handling vehicles and specifically to those having an extendible boom pivotally attached thereto and having a work implement at the other end of the boom. Particularly, this invention finds application to material handling trucks which traverse rough terrain.

BACKGROUND OF THE INVENTION

Boom operating trucks are known in the art. One of the main problems with boom operated trucks is the line of sight of the operator. Often when a load is carried at the end of the boom upon a work implement the boom is at a height to interfere with the line of sight of the operator. This creates an unsafe condition. Attempts therefor have been made to correct this problem.

U.S. Pat. No. 30,021 assigned to Loed Corporation and invented by Olson et al discloses a material handling vehicle having a boom which is extensible and pivotally attached to the rear of the vehicle and having a work element thereon. In order for the pivot to be lowered the motor 28 and transmission 108 were lowered as well to provide the vehicle with as low as center of gravity as possible. In traversing a rough terrain having many obstacles and out crops the drive train would be put at risk to damage should the truck attempt to traverse for example a rock laden field. Therefor, although the movement of the motor toward the bottom of the vehicle allows for a lower center gravity of the vehicle and for the lowering of the pivot below the level of the steering wheel of the vehicle, the drive train is still exposed to considerable damage. The cab of the vehicle is offset to one side of the vehicle and a load carrying platform is disposed at the other side of the vehicle, the two members having in between a well having a bottom wherein the extensible boom is disposed.

West German Offenlegungsschaft, 2739537 to the Loed Corporation describes a boom operated truck having a cab disposed on one side and a load carrying compartment disposed on the other, apparently the motor being turned sideways. The vehicle does not include a space or opening between the cab and the motor between substantially vertically extending frame portions.

French Publication 2624842 published in June of 1989, discloses a boom operating truck which has an engine disposed on one side of the center axis of the frame with the cab disposed on the other side. However, the pivot axes is located above the line of sight of an operator. Therefor, the low profile is not achieved even though the machine includes an offset engine.

U.K. Patent Application 2137145 describes a mobile crane or access lift platform. Included in this patent structure of the mobile crane is an drive engine 30 which is offset to one side of the axis of extension of the vehicle. Included with the transmission 36 is a support gear box 38 as best seen in relation to FIG. 3. However, no where within this reference is there described a low profile reach truck being boom operated having all of the attributes of the boom operated truck herein described.

U.S. Pat. No. 4,718,814 discloses a boom operated truck having a work implement which is pivotable with respect to the boom as illustrated in FIG. 3. However, such truck is not a low profile truck that can travel over rough terrain having a lower under carriage extending below the axial of the vehicle.

Canadian Patent 1024107 describes a boom operated truck as illustrated in FIG. 4, having a negative lift capability.

No where within the prior art is there disclosed a boom operated vehicle, the vehicle having an under carriage which is setup at a higher level than the axle of the wheels of the vehicle to insure that the vehicle can cross rough terrain. Most vehicle of the above-mentioned type are for crossing rough terrain in the construction industries involving trenches, rocks and out crops of wood stubs etc. It very likely that the under side of the vehicle can be extensively damaged by hitting a rock. Further, structures provided such as Merlo spa described in patent application WO 89/00972 provides an engine which has a vehicle driven by a hydrostatic transmission. Applicant has reviewed this application and has acquired the brochures of Merlo and has found the drives to be hydrostatic. Although the disclosure does teach the positioning of the cab on one side and the engine on the other it does not state how the power is transferred to the wheels of the vehicle. This is an important consideration when considering a rough terrain vehicle in that the transmission device may end up being damaged. It appears therefor, to the best of Applicants knowledge that Merlo has achieved such by using a hydrostatic transmission and not mechanical drive as Applicant does. Therefor, in hydrostatic transmission pumps and hydraulic motors are provided with hoses which provide the power transformation in a manner known to those skilled in the art. However, at high speeds or high working pressure such as the case with vehicles having a large load bearing capability beyond 6000 PSI requirement of the hoses, the hydrostatic transmission is not desirable. This is because of the high level of maintenance required to fix the pumps and seals of the hydrostatic motor and the hoses which leak and burst. It is much more reliable to provide a mechanical transmission means if the mechanical transmission means can be kept out of the way and up from the risk of damage from rough to rain. Therefor, all of the disadvantages of using the hydrostatic transmission are reduced by the use a mechanical transmission which will be described herein after.

Frame structures provided in the prior art are complex and generally include ferring portions which extend from the bottom frame. A trust or the like must be provided to support the boom of the truck. The trucks may be manufactured to support the boom and to provide for the tremendous loading of the pivot of the boom. Typically reinforcing is required.

The invention provides a massive frame portion which extends vertically and a second portion with extends vertically, the two portion being connected together and providing for sufficient mass and size to both support the required load of a reach truck and provide at least inpart the counter weight ability of the reach truck, as well as providing the opening within which the boom may extend in use to lower the profile of the truck.

It is therefor a primary object of this invention to provide a low profile material handling vehicle including a extensible boom with an opening defined by frame portions of the vehicle, the frame portions of the vehicle providing at least inpart counter weighting means for the vehicle and also providing the vehicle with the ability to traverse rough terrain.

It is a further object of this invention to provide a material handling vehicle including a extensible boom which includes a work implement which is pivotable with respect to the boom and is movable with respect to boom in a direction away from the boom without the need for the boom to be further extended or for the vehicle to be moved or repositioned.

It is still yet a further object of this invention to provide a low profile reach truck which is easy to operate and simple to maintain.

Further and other objects of this invention will become apparent to a man skilled in the art when considering the following summary of the invention and the more detailed description of the preferred embodiments illustrated herein.

SUMMARY OF THE INVENTION

According to one aspect of the invention there is provided a material handling vehicle comprising a top, bottom, two sides, and two ends, the vehicle having a central axis of extension extending from end to end thereof, the vehicle having a frame disposed therewith (preferably the frame including first and second portions extending substantially vertically from the vehicle, the first and second portions being of sufficient thickness to support and distribute the loads carried by the vehicle, the first and second portions being interconnected at the sides thereof proximate the central axis of the vehicle by third portions joining the first and second portions together proximate the bottoms thereof, preferably the first and second portions tapering from one end of the vehicle to the load carrying end of the vehicle, in one embodiment the first and second portions provide counterweighting means for at least a part of the vehicle), the frame having disposed proximate the bottom thereof at least a first and second axle upon which are disposed wheels for engaging terrain being traversed, the bottom of the axles defining a first plane, the frame being disposed above the first plane, the frame having disposed proximate one side thereof and to one side of the central axis of the vehicle a cab wherein an operator having a line of sight is located in use, the frame having disposed on the other side thereof and on the opposite side of the central axis of the vehicle whereat the cab is disposed, driving means (preferably a motor or engine), the driving means having a bottom, the bottom of the driving means being disposed on top of the frame and being disposed in a plane above the first plane of the vehicle, and the top of the driving means being disposed below the line of sight of the operator to allow maximum ground clearance, a clear line of sight and minimum risk of damage to the driving means, the driving means also being offset to one side of the axis of extension of the vehicle, the cab and the driving means defining therebetween an opening (preferably the opening being disposed between the first and second substantially vertical portions of the frame and extending substantially from end to end of the vehicle proximate the central axis and above the third portions), the opening being disposed above the first plane, the opening to receive an extensible boom carrying a work implement (preferably the work implement being at least two forks which when attached to the boom are pivotable with respect to the boom and extensible with respect to the boom to move a load in a direction away from the boom without moving the boom or repositioning the vehicle), the boom being pivotally attached at a pivot to the frame proximate one end of the vehicle,(preferably the boom pivotally attached at the pivot proximate the end of the first and second vertical portions remote the load carrying end of the vehicle, the pivot extending to the first and second portions), the pivot of the extensible boom being disposed above the first plane and below the line of sight of the operator to allow the operator a clear line of sight while carrying a load over rough terrain without the risk of damaging the drive train of the vehicle.

In a preferred embodiment the material handling vehicle may further comprise driving means including a motor and transmission, the motor or the transmission having engaged therewith transfer means to transfer the output thereof to the wheels of the vehicle, the transfer means comprising at least one transfer case having an input and at least one output, the input being engaged with the motor or transmission, the at least one output being in engagement with the transmission which is in engagement with at least one drive shaft when the input of the transfer case is engaged with the motor, the at least one output being in engagement with at least one drive shaft when the input is attached to the transmission, (preferably the at least one output being engaged with the at least one drive shaft by a universal joint, preferably a carden joint, and the at least one drive shaft engages at least one of the at least two axles by a universal joint, preferably a carden joint, the transfer case the drive shaft and if present the joints being disposed above the first plane of the vehicle. In one embodiment the transfer means includes a first and second transfer case, the first transfer case including input means and output means, the input means to accept power from the transmission, the output means to transfer the power to the second crankcase, the second crankcase including input means and output means, the input means to accept power from the first transfer case and to transfer that power to the at least one drive shaft, preferably the first and second transfer cases being engaged, preferably the first and second transfer cases including at least one drive sprocket and a drive chain, preferably the at least one sprocket including an input sprocket and an output sprocket.

In one embodiment the extensible boom may include a first fixed member and a second moveable member moveable in relation to the first member and contained therein, the second member being moveable by hydraulic means disposed with the boom, preferably the boom having disposed therewith upon the top exterior thereof at least one pulley about which a hydraulic hose is disposed, the pulley being attached to proximate the frame and being resiliently biased thereat by a spring or the like, the hose extending to the front of the fixed member around the pulley and to the front of the moveable member, a supplementary cover portion being provided to cover the hydraulic hose and resiliently biased pulley, whereby when the second member is moved in relation to the fixed member the spring portion extends in the direction of the movement to allow the hose to move in the same direction. By providing the hoses and pulleys external of the boom then these portions may be accessed for repair without the disassembly of the boom.

BRIEF DESCRIPTION OF THE DRAWINGS

The invention will now be illustrated with respect to the following drawings illustrating embodiments of the invention in which.

DETAILED DESCRIPTION OF PREFERRED EMBODIMENTS OF THE INVENTION

Figure 1:
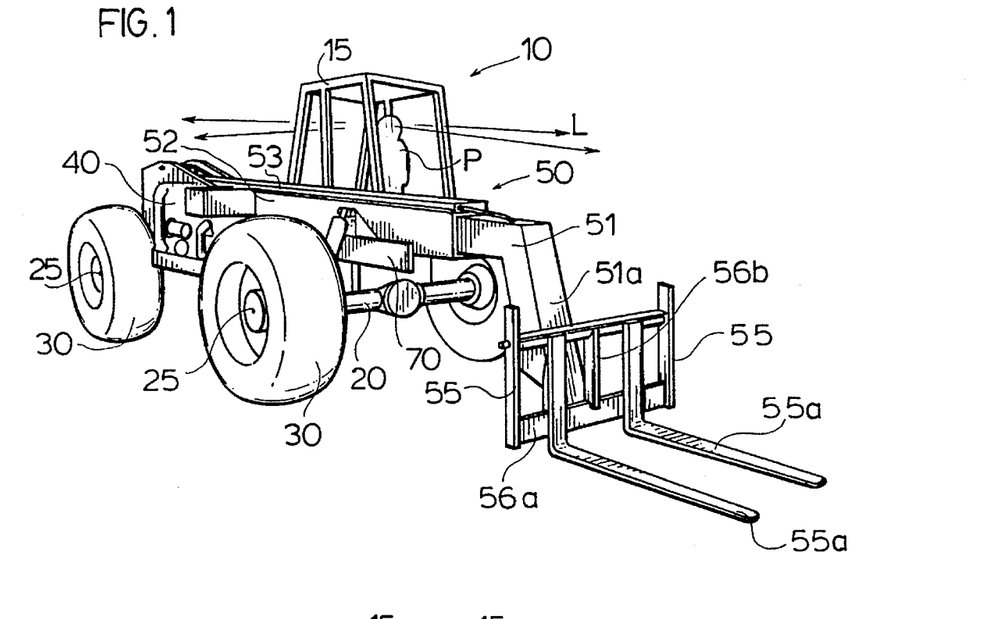
FIG. 1 is perspective view of the material handling vehicle illustrated in a preferred embodiment of the invention.

Referring now to FIG. 1 there is provided a material handling vehicle 10 having disposed therein an axle 20 at the rear and at the front of the vehicle, each axle having an end portion 25 and having a mounted upon each end a tire portion 30. The vehicle has a boom assembly 50 extending along its center line. The boom assembly is pivoted at the rear thereof at a pivot P1 via a pivot pin P2 as best illustrated in relation to FIG. 2. Now referring to FIG. 1 and 2 there is illustrated the boom 50 having a front portion 51 movable in relation to a fixed portion 51 thereby telescoping within the fixed portion 52. Of course more than two sections can be found with the vehicle as shown in relation to FIG. 3 but for simplicity sake only two sections are being described in detail. A cab 15 having a operator P working therein is mounted on the frame which is connected to the axle. On the other side of the boom 50 is disposed a motor 40 and a transmission 41 not shown in these figures and best seen in relation to FIG. 4. A frame generally referred to as 70 is made up of two substantially vertically extending thick plates of mild steel 71 and 72 precut and tapering generally from the rear of the vehicle toward the load carrying end of the vehicle. Theses portion are massive and are made from heavy steel and provide the necessary bracing and support at the rear of the vehicle where the boom 50 pivots at P1 on pin P2. The shape and tapering of the substantially vertically extending frame members 71 and 72 of frame 70 are important in that they provide at least in part in combination with counterweight 74, 73 additional counterweighting to the vehicle. Thus the frame portions provide the strength for supporting the boom and additionally impart counterweighting improvements to the vehicle.

As best seen in relation to FIG. 1 the operator has a line of a sight L which is clearly unobstructed by the pivot P1 of the boom 50 nor by the boom 50. The framing portions 71 and 72 provide an opening within which the boom extends from proximate the rear of the vehicle to proximate the load carrying end of the vehicle. This opening extends between the frame members 71 and 72 throughout the length of the vehicle. Therefore, the frame members also provide a opening for the boom, the opening best observed in relation to FIG. 4 and FIG. 5 wherein the substantially vertically extending frame member 71 and 72 are interconnected by a predetermined number of the discrete portions 70A.

Figure 2:
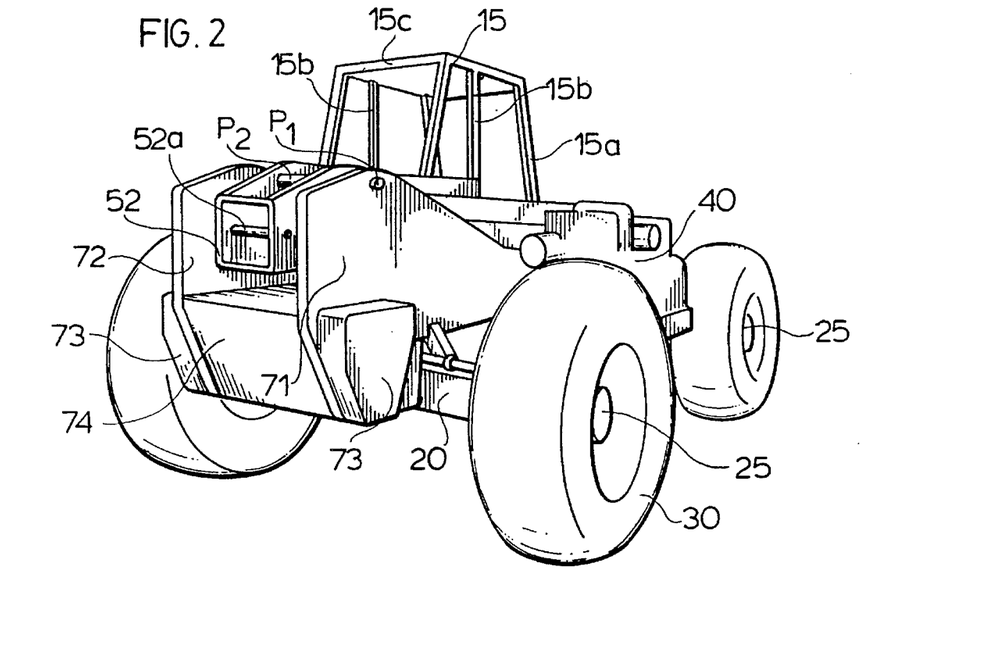
FIG. 2 is a perspective view of the vehicle of FIG. 1 illustrated in perspective from the rear of the vehicle.
Figure 3:
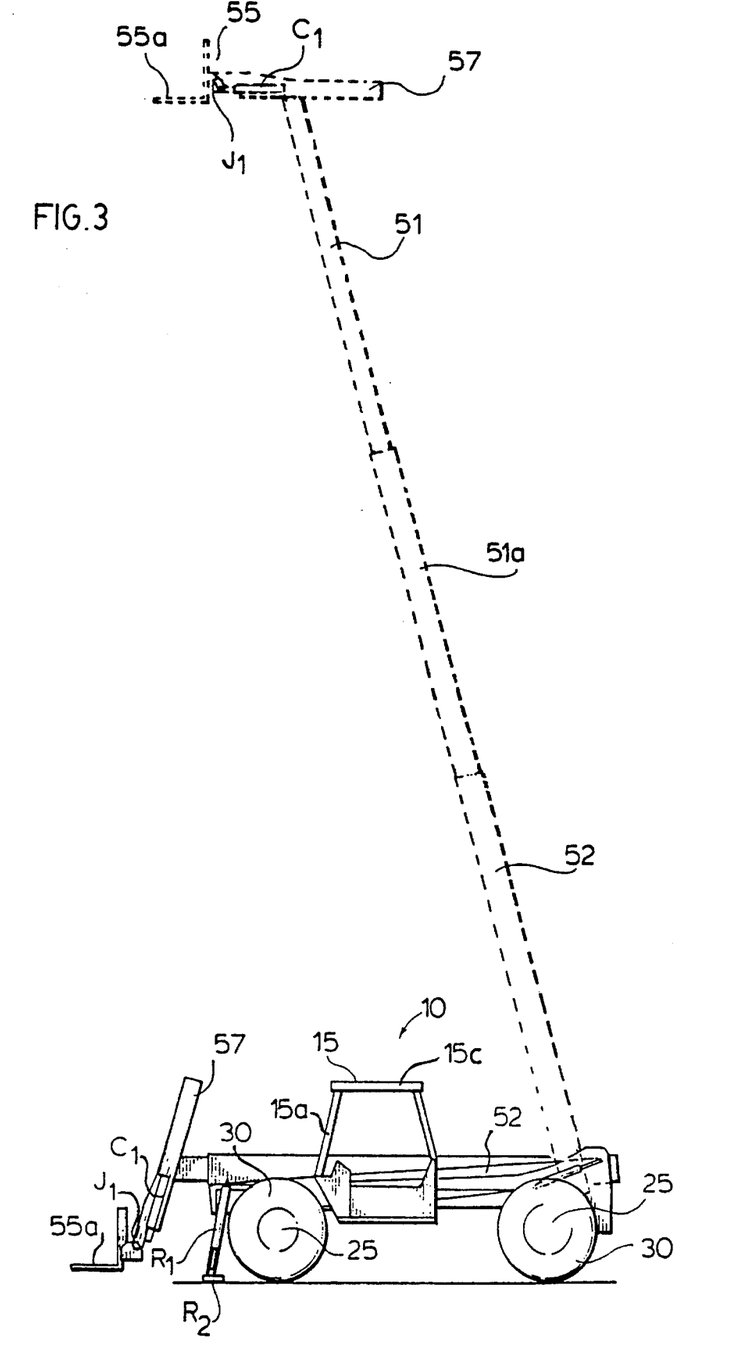
FIG. 3 is a side schematic view of the vehicle of FIG. 1 illustrated in a preferred embodiment of the invention.
Figure 9:
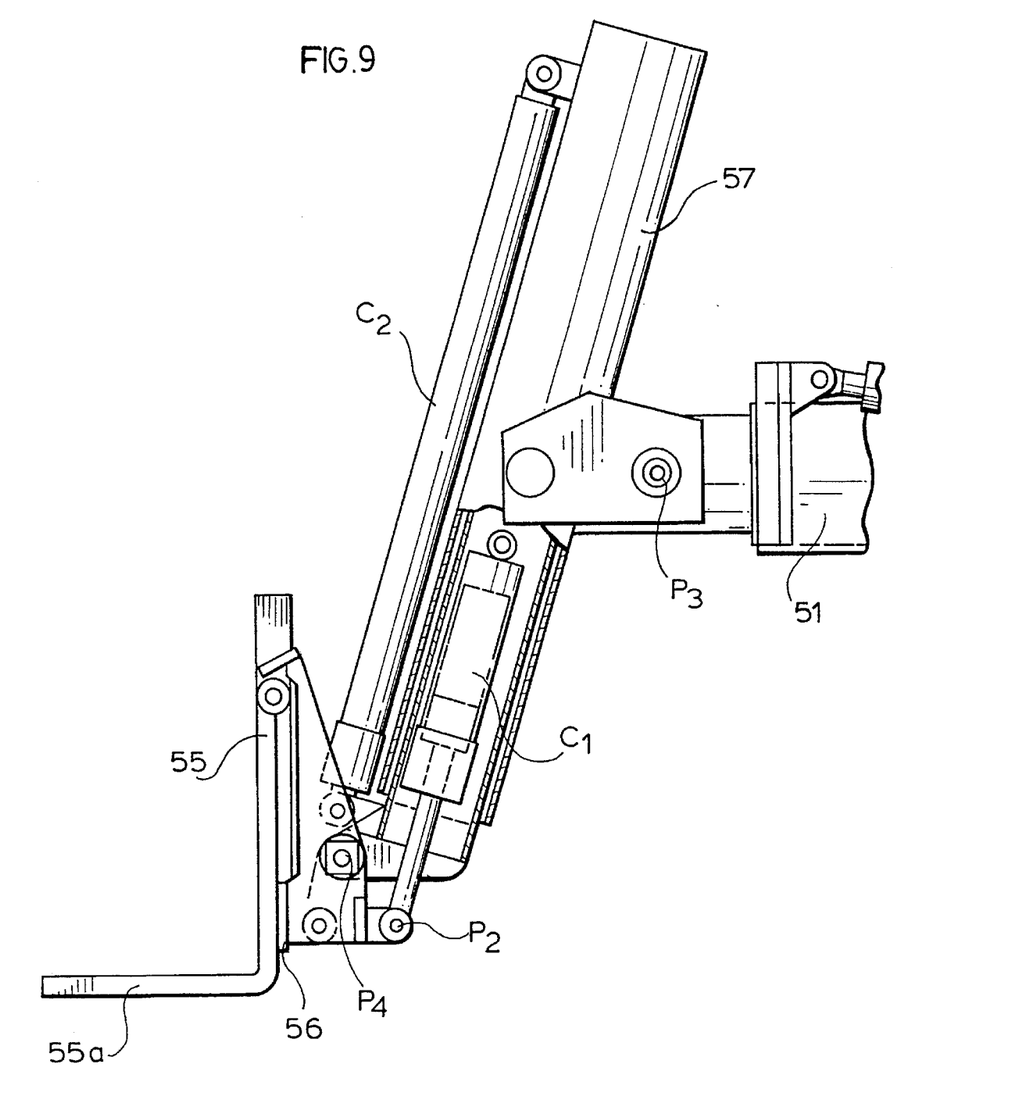
FIG. 9 is a side plan view of a work implement 57 attached to the front of the boom of the vehicle of FIG. 1 illustrated in a preferred embodiment of the invention.

Referring now to FIG. 3 there is illustrated a side view of the vehicle of FIG. 1 and FIG. 2 having an outrigger R1 with feet R2 disposed proximate the side of the front thereof, for stabilizing the vehicle as is known. The boom may extend upwardly to its maximum limit. The boom may extend also forwardly and once fixed in position by the out riggers R1 upon the wheels 30 the boom 50 may extend to expose sections 51A and 51, having a work element 57 proximate the end thereof. The forks 55A and the frame 55 are pivotable with respect to the implement 57 by a cylinder C1. Extending of the cylinder will cause the movement or the pivoting action of the forks 55A. In another embodiment of the invention as illustrated in FIG. 9 the work implement 57 attached to the boom 51 at at pivot P3 includes a second cylinder C2 which is fixed at one end of implement 57 remote the forks and is attached at the other end proximate the forks. The cylinder C2 allows the motion of the fork assembly 55 and 55A away from the boom 51 without repositioning the vehicle on its outriggers R1 and footings R2. For example, when the boom is in the fully extended upward position illustrated in FIG. 3 should a load of bricks be located on the forks 55A and it may be wished that these bricks be moved into a building, then by extending the cylinder C2 the forks may be advanced without moving the vehicle, without extending the boom and without having to readjust the out riggers after moving the vehicle. In another example, when the vehicle is being used to reach down to a load beneath ground level the cylinder C2 may be used to extend down to the load without the necessity of extending the boom thus, improving the amount of negative lift of the vehicle for operating trucks to a maximum extent.

Figure 4:
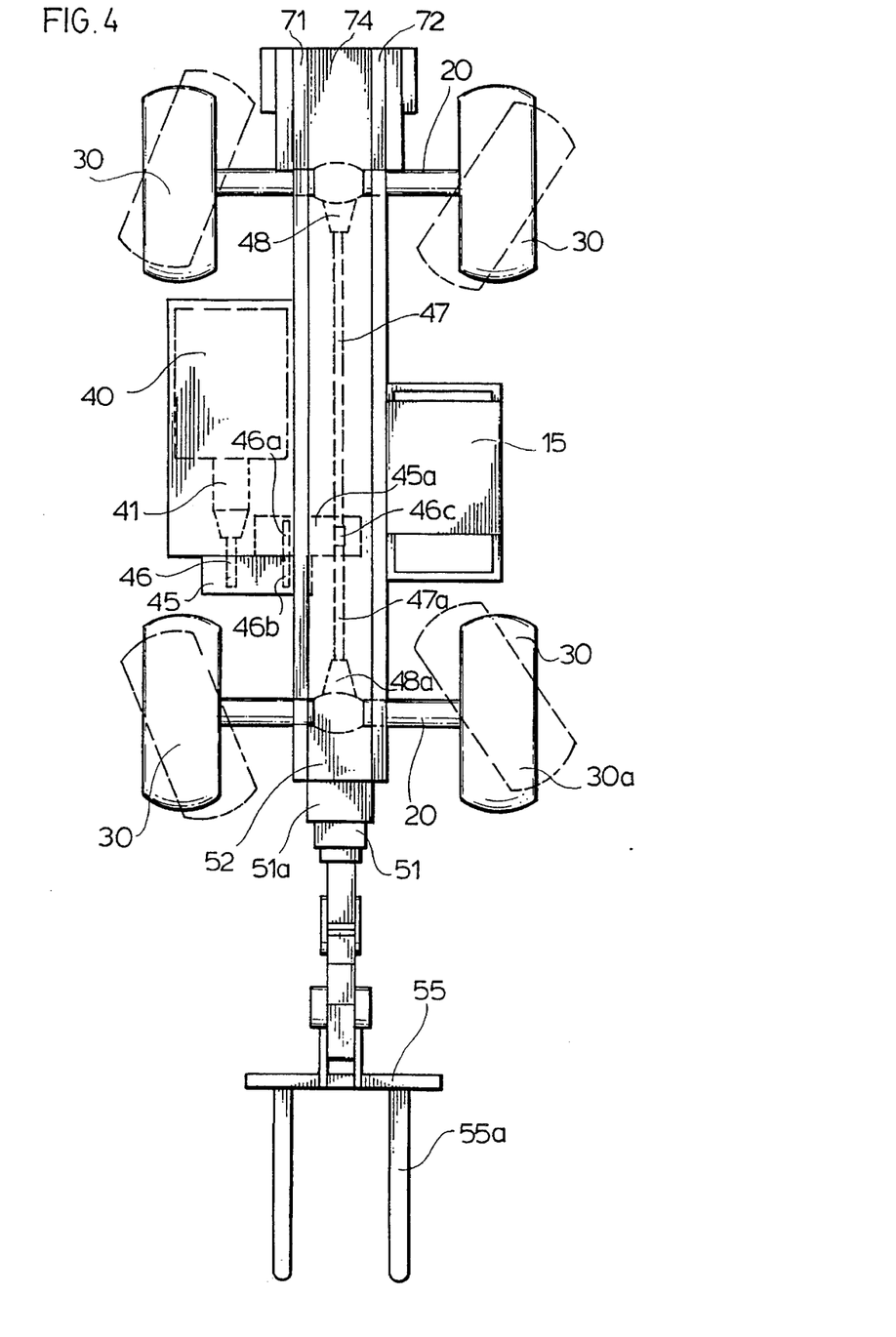
FIG. 4 is top plan view of the vehicle of FIG. 1 illustrated in a preferred embodiment of the invention.
Figure 5:
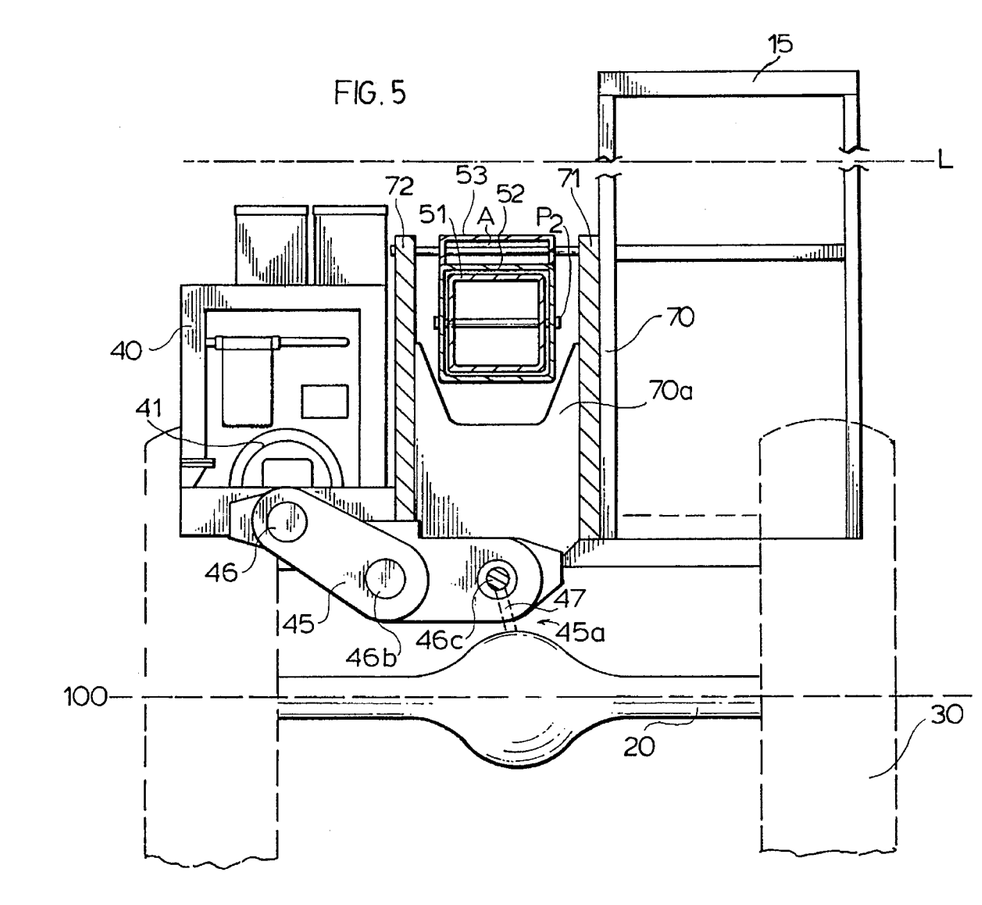
FIG. 5 is a rear elevations view of the vehicle of FIG. 1.

Referring now to FIG. 4, there is illustrated in top view the inter relationships of the portion of the vehicle schematically. Therefor, the vehicle 10 has a operator cab 15 disposed on one side of the boom 50 and a drive motor 40 the transmission 41 disposed on the other side of the boom. The boom 50 is positioned between substantially vertically extending frame portions 71 and 72 of the vehicle frame 70. The transmission 41 has a power take off shaft 46 extending into a transfer case 45 best seen in relation to FIG. 8. The transfer case extends from the end of the transmission as also seen in FIG. 5 in a direction so as to transfer the power from the transmission 41 to the drive shafts 47 and 47A. The drive shaft 47 extends to the rear wheels of the vehicle and the drive shaft 47A extends to the front end of the vehicle being coupled to the axle 20 by a universal joint 48 and 48A respectively called a carden joint. Therefor, the power is transferred to transfer case 45 through shaft 46 and then transferred through shaft 46A to the transfer case through drive chains and sprockets disposed in the initial first section of the transfer case 45, to the shaft 46A of the second transfer case 45A and out through the shaft 46C through cardan joints illustrated in the relation to FIG. 8. A boom 50 extending between the substantially vertically extending frame portion 71 and 72 and counterweighted by a counterweight 74 and 73 therefor, pivots at the rear of the vehicle within the opening between the frame portions 71, 72. The motor is moved to one side and also raised as will be described in relation to FIG. 5 to allow for the ground clearance of the vehicle over rough terrain and to allow for lowering of the booms position and the pivot of the boom. The mechanical transfer case 45 and 45A allows for a smooth transmission of power from the transmission to the drive wheels and is considered as superior to a hydrostatic transmission specifically for vehicles for higher capacity rating.

Referring now to FIG. 5 there is illustrated the inter relationship of the component of the vehicle. The frame 70 therefor having substantially vertically extending portions 71 and 72 as described in relation to FIGS. 1 and 2 and a boom 50 extending the length thereof from proximate the front to proximate the rear. The upwardly extending members 71 and 72 therefor providing a opening for the extension of the boom portion pivoted upon pivot P2. Disposed approximate the bottom of the opening are discrete flanges 70A which interconnect the upwardly extending portion 71 and 72. These discrete flanges extend at predetermined distances between 71 and 72 and are not continuous and are present to provide reinforcing for the frame 70. Disposed on one side of the opening is the cab 15 having a plane defining a line of sight L of an operator. The pivot pin P2 is below the location of the line of sight L of the operator P. The vehicle having disposed on the opposite side of the cab a drive engine 40 being an internal combustion engine power by gas of deisel fuel. It is just as easy to include an electric engine in this vehicle or a propane engine or the like.

Connected proximate one end of the motor 40 is a transmission 41 which was described in relation to FIG. 4, which connects through a shaft 46 to a first transfer case 45 which is inclined in a downward direction extending downwardly away from the transmission to a second shaft 46B which transfer the power from the transmission to the transfer case to the second transfer case 45A to a drive shaft 46C which transfer the power to the axle 20 at the rear of the vehicle through a drive shaft 47. It is important to note that a plane 100 extends through the bottom the axle of the vehicle and that no parts including the transfer case or the drive shaft are disposed below that the plane 100. The fact that all of the portions are disposed upwardly away from the axle improves the ability of the vehicle to cross rough terrain. As is when crossing rough terrain there are considerable number of out crops of rocks, wooden stubs, ruts and holes which are particularly in evidence at a construction cite. Should the undercarriage drive train be disposed at a point lower than that provided with this invention then it is probable a serious damage to the vehicle will result. By providing the motor on one side of the vehicle the invention provides for the lowering of the boom providing a low profile reach truck. By providing the motor transmission and drive train above a lower plain 100 the vehicle has also the added advantages of being able to traverse rough terrain.

Figure 5A:
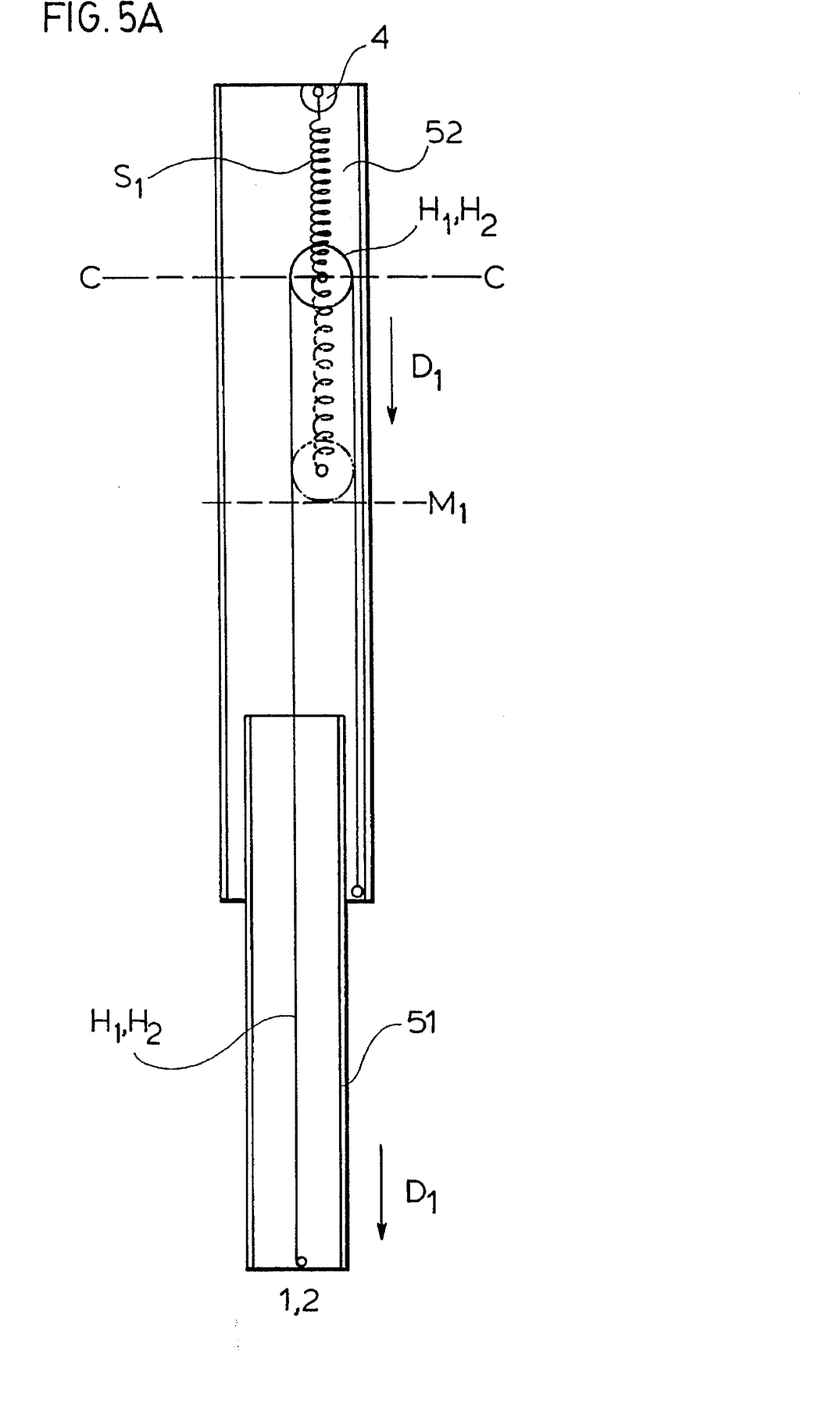
FIG. 5A is a schematic view of the external mounting of the hose and hose reels with the hydraulic system illustrated in a preferred embodiment of the invention.

Referring now to FIG. 5 and 5A there is disposed in the space A between the cover portion 53 and the fixed boom portion 52 as also observed in relation to FIG. 1 a system of pulleys and hoses and hydraulic fittings mounted externally of the boom segments. Typically these hoses and reels are located within the boom. It has been found that by locating them on the outside of the boom and by the removing of the cover 53 these components are accessible and repairable without dismantling each section of the boom in order to obtain access to the reels and hoses. Therefor, within the space A there is provided pulleys at 1 and 2 having a center line C extending there through and having hoses H1 and H2 extending to proximate the front of the first section 52 for H1 to proximate the front of the second section 51 of the hose H2. The pulleys are attached to an anchor portion 4 disposed proximate the rear of the portion 52 of the boom assembly 50 by a resiliently biased portion S1 which in this case is a helical spring having a predetermined number of turns and stiffness. The pulley therefore will move from the A position as illustrated to a position as illustrated in the ghost line at M1 to allow the first section to move in relation to the second section which is the fixed section 52. By allowing for the movement of the pulley therefor and having it fixed to the anchor 4 the hydraulic system pulley hoses operates externally of the boom 52 in the space A of FIG. 5 allowing that as the forward segment of the boom 51 moves therefor the pulley I and 2 move cooperatively. The hoses therefore are accessible as are the pulleys and the springs and the other fittings required for extension of the boom as is known in the art, all contained within a cover 53 in this space A for quick maintenance.

Figure 6:
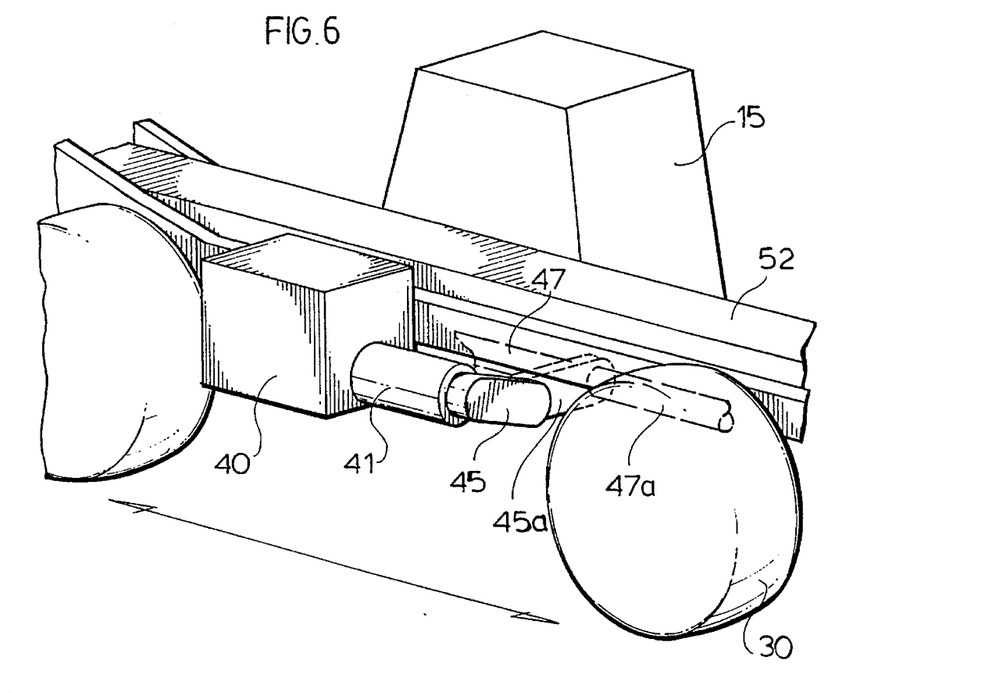
FIG. 6 and FIG. 7 illustrate alternative positionings of the transfer case of the vehicle of FIG. 1 illustrated in preferred embodiments of the invention.
Figure 7:
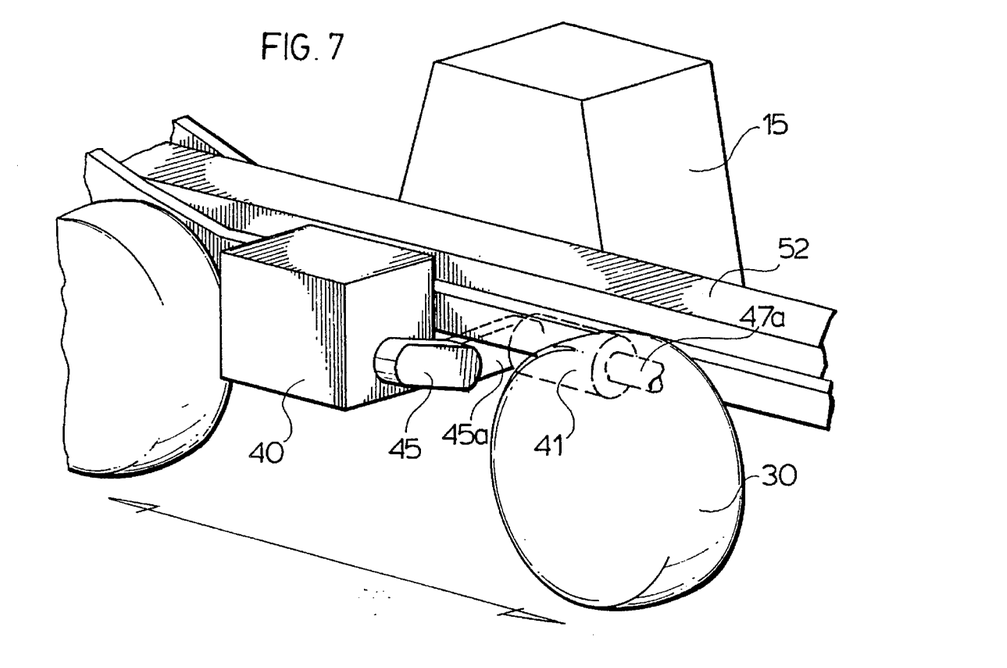

Referring now to FIGS. 6 and 7 there is described in schematic form the alternative positioning of the transfer case 45 and 45A in relation to the transmission 41 and the drive motor 40. In FIG. 6 the drive motor 40 has the transmission 41 mounted proximate thereto, and the transfer case 45 transmitting the power of the transmission to the second transfer case 45A to the shaft 47 and 47A respectively. In FIG. 7, in order to reduce the size of the transfer case required the transfer case 45 may be directly engaged to the outward shaft of the motor 40 and the power then being transferred via transfer case 45A to the transmission 41 in the drive shaft 47A. Alternatively the transmission may extend toward the rear of the vehicle set out toward the front and drive the rear wheels only. In FIG. 7 shown the drive wheels are the front wheels only. If the transmission is disposed in a rearward direction then there will be considerable length savings of the vehicle and therefor the wheel base distance would be reduced.

Figure 8:
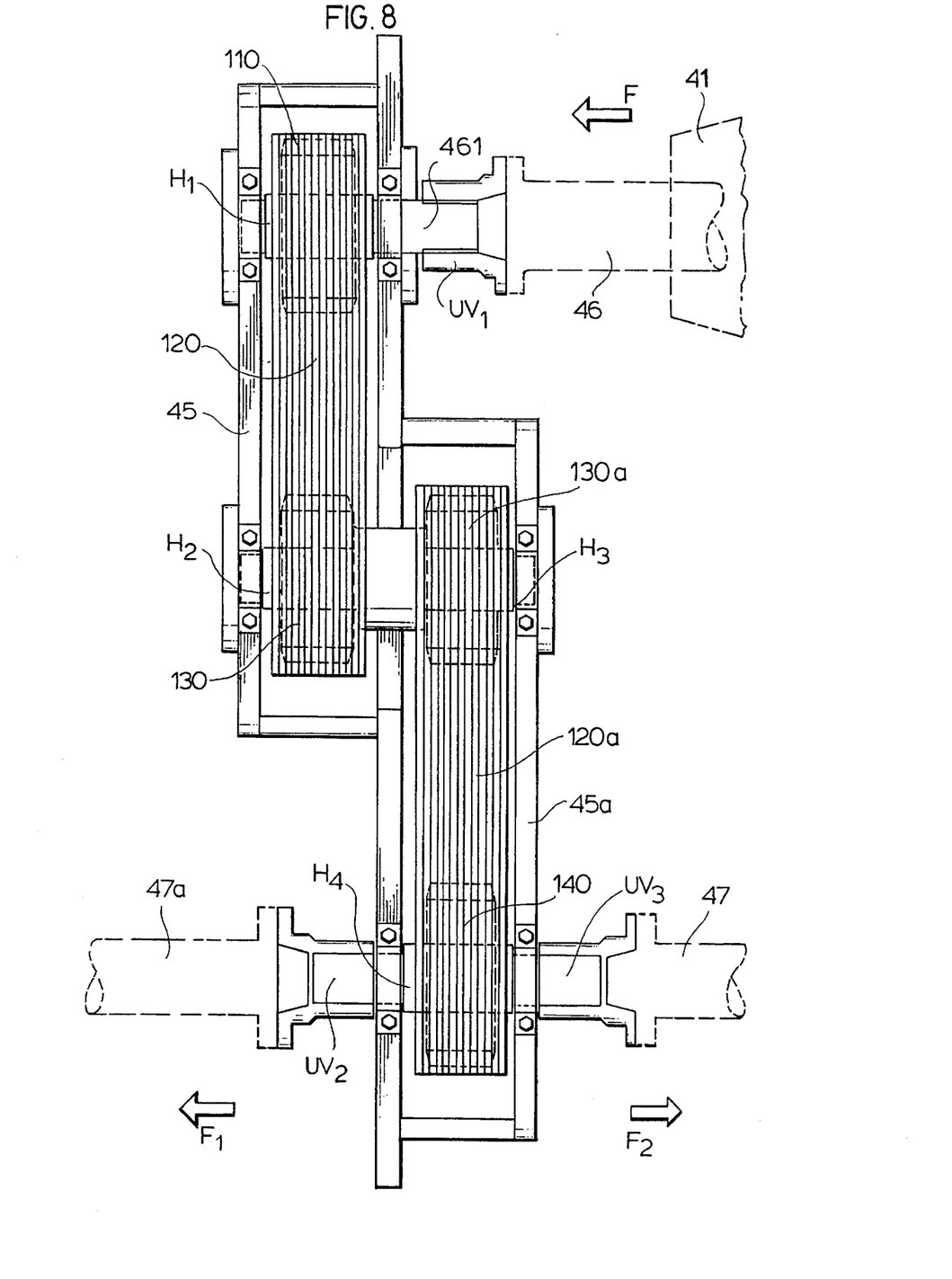
FIG. 8 is a close-up schematic view illustrating the details of the transfer case of FIG. 6 and 7 illustrated in a preferred embodiment of the invention.

Referring now to FIG. 8, there is provided in plan view from the top, a view of the out put of FIG. 6 in detail. Therefor, the transmission 41 provides via the drive shaft 46 a drive force F, a drive shaft 46 is connected to a drive shaft 46(1) within the transfer case 45 through a universal joint UV(1) which transmit the power to the transfer case through a hub H1 of a sprocket 110. The sprockets 110 are identical in diameter to the sprocket 130 of the first transfer case 45 and the to sprockets 130A and 140 the second transfer case 145A. The sprockets 130 has a hub H2 the sprocket 130A has a hub H3 and the sprocket 140 has a hub H4 upon which each of the sprockets rotate and provide the necessary transmission of power through the respective shafts thereof. A drive chain 120 is as commonly used for a transfer cases is provided to merge with the teeth of the drive sprocket 110 and 130 for the first transfer case 45. To transfer the power by force F through the second transfer case through a direct transfer to a hub 130A and the shaft extending between the hub H2 and H3 there being disposed a second drive chain 120A being driven at the same speed as the drive chain 120, the first transfer case 45. The transfer of the power to the last sprocket 140 through to the hub H4 through to the universal joint UV2 and UV3 which in essence are power takeoffs to drive the forward and rearward drive axle via the drive shafts 47 and 47A respectively there being a transmitted force of F1 and F2 to these axles.

Should the embodiment of FIG. 7 be considered then the drive force off the motor 40 would be transmitted to a reduce transfer case having a smaller size sprocket and chain because of the gearing size in the transmission in relation in relation to FIG. 6 which has to be compensated for installing a transfer case in the embodiment of FIG. 6.

Therefor, a low profile boom operated vehicle has been provided which may include alternative work implements at the front thereof. The boom is formed from at least two portions which extend substantially vertically within one another and have the hydraulic hoses pulleys and fittings disposed externally of the boom within a covered space above the boom assembly to allow ease of access. An opening between the frame member 71 and 72 is provided when the boom is pivoted upon a pivot P2. These portion 71 and 72 provide an opening therebetween of a cab being disposed on one side of the frame portions and the motor being disposed on the other. Further, by forming the framing portion as illustrated in relation to FIG. 2 the framing portion 71,72 not only to provide reinforcing and supports but shedding the load of the boom to the vehicle, but also provide at least a portion of the counter weighting of the vehicle. Finally, the vehicle is provided with a mechanical transfer case from the motor or transmission which is disposed in a plane above the plane of the axle the vehicle thereby allowing the traversing of rough terrain without damaging the drive train of the vehicle. In doing so the motor is also moved to the side of the vehicle to allow for the lowering of the profile of the vehicle with the boom extending between the openings between the vertically extending portion 71, 72 and the drive train is also raised over those structure known in the prior art to allow the traversing of rough terrain.

Within the description there is no intention to limit the meaning of the terms as described and like portions may be substituted for like portions without changing the meaning of the invention. For example, a work implement may be a bucket used for excavating soil in a construction site. Further, the motor may be an electric motor.

As many changes can be made to the preferred embodiments of the invention without departing from the scope thereof; it is intended that all matter contained herein be considered illustrative of the invention and not in a limiting sense.

The embodiment of the invention in which an exclusive property or privlege is claimed are as follows:

1. A material handling vehicle comprising a top, bottom, two sides, and two ends, the vehicle having a central axis of extension extending from end to end thereof, the vehicle having a frame disposed therewith, the frame having disposed proximate the bottom thereof at least a first and second axle upon which are disposed wheels for engaging terrain being traversed, the bottom of the axles defining a first plane, the frame being disposed above the first plane, the frame having disposed proximate one side thereof and to one side of the central axis of the vehicle a cab wherein an operator having a line of sight is located in use, the frame having disposed on the other side thereof and on the opposite side of the central axis of the vehicle whereat the cab is disposed, driving means, the driving means having a bottom, the bottom of the driving means being disposed on top of the frame and being disposed in a plane above the first plane of the vehicle, and the top of the driving means being disposed below the line of sight of the operator to allow maximum ground clearance, a clear line of sight and minimum risk of damage to the driving means, the driving means also being offset to one side of the axis of extension of the vehicle, the cab and the driving means defining there between an opening the opening being disposed above the first plane, the opening to receive an extensible boom carrying a work implement, the boom being pivotally attached at a pivot to the frame proximate one end of the vehicle, the pivot of the extensible boom being disposed above the first plane and below the line of sight of the operator to allow the operator a clear line of sight while carrying a load over rough terrain without the risk of damaging the drive train of the vehicle, wherein the frame includes first and second portions extending substantially vertically from the vehicle, the first and second portions being of sufficient thickness to support and distribute the loads carried by the vehicle, said first and second portions being massive and providing the necessary bracing and support at the rear of the vehicle where the boom pivots, the first and second portions being interconnected at the sides thereof proximate the central axis of the vehicle by third portions joining the first and second portions together proximate the bottoms thereof wherein the extensible boom includes a first fixed member and a second moveable member moveable in relation to the first member and contained therein, the second member being moveable by hydraulic means disposed with the boom, the boom having disposed therewith upon the top exterior thereof at least one pulley about which a hydraulic hose is disposed, the pulley being attached to proximate the pivoted end of the fixed boom member and being resiliently biased thereat by a spring, the hose extending to the front of the fixed member around the pulley and to the front of the moveable member, a supplementary cover portion being provided to cover the hydraulic hose and resiliently biased pulley, whereby when the second member is moved in relation to the fixed member the spring portion extends in the direction of the movement to allow the hose to move in the same direction whereby by providing the hoses and pulleys external of the boom these portions may be accessed for repair without the disassembly of the boom.

2. The vehicle of claim 1 wherein the first and second portions taper from one end of the vehicle towards the load carrying end of the vehicle.

3. The vehicle of claim 1 wherein the first and second portions provide counterweighting means for at least a part of the vehicle.

4. The vehicle of claim 2 wherein the first and second portions provide counterweighting means for at least a part of the vehicle.

5. The vehicle of claim 1 wherein the driving means is a motor or engine.

6. The vehicle of claim 2 wherein the driving means is a motor or engine.

7. The vehicle of claim 3 wherein the driving means is a motor or engine.

8. The vehicle of claim 4 wherein the driving means is a motor or engine.

9. The vehicle of claim 1 wherein the opening is disposed between the first and second substantially vertical portions of the frame and extends substantially from end to end of the vehicle proximate the central axis and above the third portions.

10. The vehicle of claim 2 wherein the opening is disposed between the first and second substantially vertical portions of the frame and extends substantially from end to end of the vehicle proximate the central axis and above the third portions.

11. The vehicle of claim 3 wherein the opening is disposed between the first and second substantially vertical portions of the frame and extends substantially from end to end of the vehicle proximate the central axis and above the third portions.

12. The vehicle of claim 4 wherein the opening is disposed between the first and second substantially vertical portions of the frame and extends substantially from end to end of the vehicle proximate the central axis and above the third portions.

13. The vehicle of claim 5 wherein the opening is disposed between the first and second substantially vertical portions of the frame and extends substantially from end to end of the vehicle proximate the central axis and above the third portions.

14. The vehicle of claim 6 wherein the opening is disposed between the first and second substantially vertical portions of the frame and extends substantially from end to end of the vehicle proximate the central axis and above the third portions.

15. The vehicle of claim 1 wherein the work implement includes at least two forks moveably attached to the boom by attachment means, said at least two forks being pivotable with respect to the boom and extensible with respect to the boom by said attachment means, such movement of said forks providing movement of a load in a direction away from the boom without moving the boom or repositioning the vehicle.

16. The vehicle of claim 2 wherein the work implement includes at least two forks moveably attached to the boom by attachment means, said at least two forks being pivotable with respect to the boom and extensible with respect to the boom by said attachment means, such movement of said forks providing movement of a load in a direction away from the boom without moving the boom or repositioning the vehicle.

17. The vehicle of claim 3 wherein the work implement includes at least two forks moveably attached to the boom by attachment means, said at least two forks being pivotable with respect to the boom and extensible with respect to the boom by said attachment means, such movement of said forks providing movement of a load in a direction away from the boom without moving the boom or repositioning the vehicle.

18. The vehicle of claim 4 wherein the work implement includes at least two forks moveably attached to the boom by attachment, said at least two forks being pivotable with respect to the boom and extensible with respect to the booms by said attachment means, such movement of said forks providing movement of a load in a direction away from the boom without moving the boom or repositioning the vehicle.

19. The vehicle of claim 9 wherein the work implement includes at least two forks moveably attached to the boom by attachment means, said at least two forks being pivotable with respect to the boom and extensible with respect to the boom by said attachment means, such movement of said forks providing movement of a load in a direction away from the boom without moving the boom or repositioning the vehicle.

20. The vehicle of claim 1 wherein the boom is pivotally attached at the pivot proximate the end of the first and second vertical portions remote the load carrying end of the vehicle, the pivot extending between the first and second portions.

21. The vehicle of claim 2 wherein the boom is pivotally attached at the pivot proximate the end of the first and second vertical portions remote the load carrying end of the vehicle, the pivot extending between the first and second portions.

22. The vehicle of claim 3 wherein the boom is pivotally attached at the pivot proximate the end of the first and second vertical portions remote the load carrying end of the vehicle, the pivot extending between the first and second portions.

23. The vehicle of claim 4 wherein the boom is pivotally attached at the pivot proximate the end of the first and second vertical portions remote the load carrying end of the vehicle, the pivot extending between the first and second portions.

24. The vehicle of claim 9 wherein the boom is pivotally attached at the pivot proximate the end of the first and second vertical portions remote the load carrying end of the vehicle, the pivot extending between the first and second portions.

25. The vehicle of claim 10 wherein the boom is pivotally attached at the pivot proximate the end of the first and second vertical portions remote the load carrying end of the vehicle, the pivot extending between the first and second portions.

26. The vehicle of claim 11 wherein the boom is pivotally attached at the pivot proximate the end of the first and second vertical portions remote the load carrying end of the vehicle, the pivot extending between the first and second portions.

27. The vehicle of claim 12 wherein the boom is pivotally attached at the pivot proximate the end of the first and second vertical portions remote the load carrying end of the vehicle, the pivot extending between the first and second portions.

28. The vehicle of claim 15 wherein the boom is pivotally attached at the pivot proximate the end of the first and second vertical portions remote the load carrying end of the vehicle, the pivot extending to the first and second portions.

29. The vehicle of claim 16 wherein the boom is pivotally attached at the pivot proximate the end of the first and second vertical portions remote the load carrying end of the vehicle, the pivot extending between the first and second portions.

30. The vehicle of claim 17 wherein the boom is pivotally attached at the pivot proximate the end of the first and second vertical portions remote the load carrying end of the vehicle, the pivot extending between the first and second portions.

31. The vehicle of claim 18 wherein the boom is pivotally attached at the pivot proximate the end of the first and second vertical portions remote the load carrying end of the vehicle, the pivot extending between the first and second portions.

32. A material handling vehicle comprising a top, bottom, two sides, and two ends, the vehicle having a central axis of extension extending from end to end thereof, the vehicle having a frame disposed therewith, the frame having disposed proximate the bottom thereof at least a first and second axle upon which are disposed wheels for engaging terrain being traversed, the bottom of the axles defining a first plane, the frame being disposed above the first plane, the frame having disposed proximate one side thereof and to one side of the central axis of the vehicle a cab wherein an operator having a line of sight is located in use, the frame having disposed on the other side thereof and on the opposite side of the central axis of the vehicle whereat the cab is disposed, driving means, the driving means having a bottom, the bottom of the driving means being disposed on top of the frame and being disposed in a plane above the first plane of the vehicle, and the top of the driving means being disposed below the line of sight of the operator to allow maximum ground clearance, a clear line of sight and minimum risk of damage to the driving means, the driving means also being offset to one side of the axis of extension of the vehicle, the cab and the driving means defining there between an opening the opening being disposed above the first plane, the opening to receive an extensible boom carrying a work implement the boom being pivotally attached at a pivot to the frame proximate one end of the vehicle, the pivot of the extensible boom being disposed above the first plane and below the line of sight of the operator to allow the operator a clear line of sight while carrying a load over rough terrain without the risk of damaging the drive train of the vehicle, further comprising transmission, the driving means having engaged therewith transfer means to transfer the output thereof to the wheels of the vehicle, wherein the transfer means includes a first and second transfer case wherein each transfer case contains a drive chain and two sprockets, the first transfer case including input means and output means, the input means to accept power from the driving means, the output means to transfer the power to the second transfer case, the second transfer case including input means and output means, the input means to accept power from the first transfer case and to transfer that power to the transmission which is connected to at least one drive shaft whereby the transmission is located below the driving means.

33. The vehicle of claim 1 wherein the driving means further comprises a motor, a transmission and at least one drive shaft, the driving means having engaged therewith transfer means to transfer the output thereof to the wheels of the vehicle, wherein the transfer means includes a first and second transfer case wherein each transfer case contains a drive chain and two sprockets, the first transfer case including input means and output means, the input means to accept power from the transmission, the output means to transfer the power to the second transfer case, the second transfer case including input means and output means, the input means to accept power from the first transfer case and to transfer that power to the at least one drive shaft.

34. The vehicle of claim 2 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

35. The vehicle of claim 3 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is is attached to the transmission.

36. The vehicle of claim 4 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

37. The vehicle of claim 9 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

38. The vehicle of claim 9 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

39. The vehicle of claim 11 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

40. The vehicle of claim 12 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

41. The vehicle of claim 15 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

42. The vehicle of claim 16 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

43. The vehicle of claim 17 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

44. The vehicle of claim 18 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said least one drive shaft when the input of the transfer case is attached to the transmission.

45. The vehicle of claim 20 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

46. The vehicle of claim 21 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

47. The vehicle of claim 22 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

48. The vehicle of claim 23 wherein the driving means further comprises a motor, a transmission and at least one drive shaft, the driving means having engaged therewith transfer means to transfer the output thereof to the wheels of the vehicle, the transfer means comprising at least one transfer case having an input and at least one output, the input being engaged with the driving means, the at least one output being in engagement with said at least one drive shaft when the input of the transfer case is attached to the transmission.

49. The vehicle of claim 32 wherein the at least one output of the second transfer case is engaged with the at least one drive shaft by a universal joint and the at least one drive shaft engages at least one of the at least two axles by a universal joint, the second transfer case, the drive shaft and the joints being disposed above the first plane of the vehicle.

50. The vehicle of claim 33 wherein the at least one output of the second transfer case is engaged with the at least one drive shaft by a universal joint and the at least one drive shaft engages at least one of the at least two axles by a universal joint, the second transfer case, the drive shaft and the joints being disposed above the first plane of the vehicle.

51. The vehicle of claim 34 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

52. The vehicle of claim 35 wherein the at least one output is engaged with the at least one drive shaft by a universal joint, and the at least one drive shaft engages at least one of the at least two axles by a universal joint, the at least one transfer case, the drive shaft and the joints being disposed above the first plane of the vehicle.

53. The vehicle of claim 36 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

54. The vehicle of claim 37 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

55. The vehicle of claim 38 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

56. The vehicle of claim 39 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

57. The vehicle of claim 40 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

58. The vehicle of claim 41 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

59. The vehicle of claim 42 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

60. The vehicle of claim 43 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

61. The vehicle of claim 44 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

62. The vehicle of claim 45 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

63. The vehicle of claim 46 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

64. The vehicle of claim 47 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

65. The vehicle of claim 48 wherein the at least one output is engaged with the at least one drive shaft by a universal joint and the at least one drive shaft engages at least one of the at least two axles by a universal joint, the at least one transfer case, the drive shaft and the joints being disposed above the first plane of the vehicle.

66. A material handling vehicle comprising a top, bottom, two sides, and two ends, the vehicle having a central axis of extension extending from end to end thereof, the vehicle having a frame disposed therewith the frame having disposed proximate the bottom thereof at least a first and second axle upon which are disposed wheels for engaging terrain being traversed, the bottom of the axles defining a first plane, the frame being disposed above the first plane, the frame having disposed proximate one side thereof and to one side of the central axis of the vehicle a cab wherein an operator having a line of sight is located in use, the frame having disposed on the other side thereof and on the opposite side of the central axis of the vehicle whereat the cab is disposed, driving means, the driving means having a bottom, the bottom of the driving means being disposed on top of the frame and being disposed in a plane above the first plane of the vehicle, and the top of the driving means being disposed below the line of sight of the operator to allow maximum ground clearance, a clear line of sight and minimum risk of damage to the driving means, the driving means also being offset to one side of the axis of extension of the vehicle, the cab and the driving means defining there between an opening the opening being disposed above the first plane, the opening to receive an extensible boom carrying a work implement, the boom being pivotally attached at a pivot to the frame proximate one end of the vehicle, the pivot of the extensible boom being disposed above the first plane and below the line of sight of the operator to allow the operator a clear line of sight while carrying a load over rough terrain without the risk of damaging the drive train of the vehicle wherein the extensible boom includes a first fixed member and a second moveable member moveable in relation to the first member and contained therein, the second member being moveable by hydraulic means disposed with the boom, the boom having disposed therewith upon the top exterior thereof at least one pulley about which a hydraulic hose is disposed, the pulley being attached to proximate the pivoted end of the fixed boom member and being resiliently biased thereat by a spring, the hose extending to the front of the fixed member around the pulley and to the front of the moveable member, a supplementary cover portion being provided to cover the hydraulic hose and resiliently biased pulley, whereby when the second member is moved in relation to the fixed member the spring portion extends in the directing of the movement to allow the hose to move in the same direction whereby by providing the hoses and pulleys external of the boom these portions may be accessed for repair without the disassembly of the boom.

67. The vehicle of claim 32 wherein the extensible boom includes a first fixed member and a second moveable member moveable in relation to the first member and contained therein, the second member being moveable by hydraulic means disposed with the boom, the boom having disposed therewith upon the top exterior thereof at least one pulley about which a hydraulic hose is disposed, the pulley being attached to proximate the pivoted end of the fixed boom member and being resiliently biased thereat by a spring, the hose extending to the front of the fixed member around the pulley and to the front of the moveable member, a supplementary cover portion being provided to cover the hydraulic hose and resiliently biased pulley, whereby when the second member is moved in relation to the fixed member the spring portion extends in the direction of the movement to allow the hose to move in the same direction whereby by providing the hoses and pulleys external of the boom these portions may be accessed for repair without the disassembly of the boom.

68. The vehicle of claim 33 Wherein the extensible boom includes a first fixed member and a second moveable member moveable in relation to the first member and contained therein, the second member being moveable by hydraulic means disposed with the boom, the boom having disposed therewith upon the top exterior thereof at least one pulley about which a hydraulic hose is disposed, the pulley being attached to proximate the pivoted end of the fixed boom member and being resiliently biased thereat by a spring, the hose extending to the front of the fixed member around the pulley and to the front of the moveable member, a supplementary cover portion being provided to cover the hydraulic hose and resiliently biased pulley, whereby when the second member is moved in relation to the fixed member the spring portion extends in the direction of the movement to allow the hose to move in the same direction whereby by providing the hoses and pulleys external of the boom these portions may be accessed for repair without the disassembly of the boom.

* * * * *